(12) United States Patent
Zou et al.

(10) Patent No.: US 12,321,037 B2
(45) Date of Patent: Jun. 3, 2025

(54) OPTICAL SYSTEM, CAMERA MODULE, AND AUTOMOBILE

(71) Applicant: JIANGXI JINGCHAO OPTICAL CO., LTD., Nanchang (CN)

(72) Inventors: Hairong Zou, Nanchang (CN); Yuming Le, Nanchang (CN); Byoungtaek Yoo, Nanchang (CN); Binli Lan, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 580 days.

(21) Appl. No.: 17/633,197

(22) PCT Filed: Aug. 7, 2019

(86) PCT No.: PCT/CN2019/099542
§ 371 (c)(1),
(2) Date: Feb. 5, 2022

(87) PCT Pub. No.: WO2021/022500
PCT Pub. Date: Feb. 11, 2021

(65) Prior Publication Data
US 2022/0334352 A1 Oct. 20, 2022

(51) Int. Cl.
*G02B 9/60* (2006.01)
*G02B 5/20* (2006.01)

(52) U.S. Cl.
CPC .............. *G02B 9/60* (2013.01); *G02B 5/208* (2013.01)

(58) Field of Classification Search
CPC ........... G02B 9/60; G02B 5/208; G02B 13/04
See application file for complete search history.

(56) References Cited

U.S. PATENT DOCUMENTS

| 5,933,286 | A | 8/1999 | Yamada et al. |
| 8,116,013 | B2 * | 2/2012 | Yoshida ................. G02B 9/60 |
| | | | 359/770 |

(Continued)

FOREIGN PATENT DOCUMENTS

| CN | 100480767 C | 4/2009 |
| CN | 203350520 U | 12/2013 |

(Continued)

OTHER PUBLICATIONS

"Optical Theory Simplified: 9 Fundamentals To become An Optical Genius", by Edmund Optics, May 4, 2019.*

(Continued)

*Primary Examiner* — Balram T Parbadia
*Assistant Examiner* — John Curtis Sipes
(74) *Attorney, Agent, or Firm* — Franklin & Associates International Inc; Matthew F. Lambrinos

(57) ABSTRACT

An optical system, sequentially comprising from an object side to an image side: a first lens having a negative refractive power, an object-side surface of the first lens being a convex surface, and an image-side surface thereof being a concave surface; a second lens having a negative refractive power, an image-side surface of the second lens being a concave surface; a third lens having a positive refractive power; a diaphragm; a fourth lens having a positive refractive power; and a fifth lens having a negative refractive power. The optical system satisfies the following relationship: (SD S2)/(RDY S2)<0.93, wherein SD S2 is the Y-direction half aperture of the image-side surface of the first lens, and RDY S2 is the Y radius of the image-side surface of the first lens.

16 Claims, 6 Drawing Sheets

(56) References Cited

U.S. PATENT DOCUMENTS

| | | | |
|---|---|---|---|
| 8,654,457 B2* | 2/2014 | Jin | G02B 13/06 |
| | | | 359/770 |
| 2015/0070788 A1* | 3/2015 | Kubota | G02B 9/60 |
| | | | 359/770 |
| 2015/0185443 A1* | 7/2015 | Ahn | G02B 13/0045 |
| | | | 359/770 |
| 2016/0062078 A1* | 3/2016 | Huang | G02B 9/34 |
| | | | 359/770 |
| 2019/0054880 A1* | 2/2019 | Muddukrishna | |
| | | | G08B 13/19647 |
| 2019/0101725 A1* | 4/2019 | Jung | G02B 9/58 |
| 2020/0057258 A1* | 2/2020 | Oinuma | G02B 7/10 |
| 2020/0301105 A1* | 9/2020 | Jung | G02B 21/36 |
| 2020/0301106 A1* | 9/2020 | Jung | G02B 13/002 |
| 2020/0371322 A1* | 11/2020 | Kanzaki | G02B 13/04 |

FOREIGN PATENT DOCUMENTS

| | | |
|---|---|---|
| CN | 203838397 U | 9/2014 |
| CN | 104749750 A | 7/2015 |
| CN | 106199921 A | 12/2016 |
| EP | 2299306 A4 | 6/2013 |
| JP | 2013003546 A | 1/2013 |
| WO | 2021022500 A1 | 2/2021 |
| WO | 2021051277 A1 | 3/2021 |

OTHER PUBLICATIONS

Written Opinion issued Apr. 24, 2020, on a PCT No. PCT/CN2019/099542, filed Aug. 7, 2019.
Written Opinion issued Feb. 5, 2022, on a PCT No. PCT/CN2019/099542, filed Aug. 7, 2019.
International Search Report issued Apr. 15, 2020, on a PCT No. PCT/CN2019/099542, filed Aug. 7, 2019.
Written Opinion issued Mar. 15, 2022, on a PCT No. PCT/CN2019/106226, filed Sep. 17, 2019.
U.S. Appl. No. 17/760,754, 371 issued Mar. 15, 2022, in the name of Jiangxi Jingchao Optical Co. Ltd.

* cited by examiner

OPTICAL SYSTEM, CAMERA MODULE, AND AUTOMOBILE

CROSS REFERENCE TO RELATED APPLICATION

This application is a national stage, filed under 35 U.S.C. § 371, of International Application No. PCT/CN2019/099542, filed on Aug. 7, 2019, and entitled "OPTICAL SYSTEM, CAMERA MODULE, AND AUTOMOBILE", the content of which is incorporated herein in entirety by reference.

TECHNICAL FIELD

The present disclosure relates to the field of optical imaging, and in particular, to an optical system, a camera module, and a vehicle.

BACKGROUND

With the rapid development of image and calculator vision technologies, more and more technologies have been applied to the field of automotive electronics. A conventional image-based vehicle backup camera system is provided with a camera only in the rear of a vehicle, which can only eliminate a visual blind region in the rear of the vehicle, but cannot eliminate visual blind regions on two sides of a vehicle body and in front of the vehicle, so vehicle driving still has large potential safety hazards. Especially in narrow and congested urban streets and parking lots, a large range of visual blind regions easily lead to collisions and scratches. In order to expand a driver's field of vision and achieve 360° panoramic scene acquisition as far as possible, a plurality of camera modules is required to be arranged on the vehicle to cooperate with each other and form a whole set of images around the vehicle body through video synthesis processing.

In order to achieve the above effects and reduce the number of the camera modules arranged, the camera modules arranged on the vehicle generally have wide-angle characteristics. A first lens of the camera modules having wide-angle characteristics generally has a straw hat structure. An image side surface of the lens is relatively curved. As a result, a difference in degree of curvature of the center and edges of the image side surface is too large to lead to uneven coating, which is easy to produce ghosts and reduce imaging quality, thereby affecting the driver's judgment on orientations and distances of obstacles.

SUMMARY

According to various embodiments of the present application, an optical system, a camera module, and a vehicle are provided.

An optical system, including, sequentially from an object side to an image side:
a first lens having a negative refractive power, an object side surface of the first lens being convex, and an image side surface of the first lens being concave;
a second lens having a negative refractive power, an image side surface of the second lens being concave;
a third lens having a positive refractive power;
a stop;
a fourth lens having a positive refractive power; and
a fifth lens having a negative refractive power;
the optical system satisfying a following relation:

$(SD\ S2)/(RDY\ S2) < 0.93;$ where SD S2 denotes a Y-direction semi-aperture of the image side surface of the first lens, and RDY S2 denotes a Y-radius of the image side surface of the first lens.

A camera module, including a photosensitive element and the optical system according to any one of the above embodiments, the photosensitive element being arranged on the image side of the optical system.

A vehicle, including a vehicle body, a display device and a plurality of camera modules according to the above embodiments, the plurality of camera modules being in communication connection with the display device, a front side, a rear side, a left side and a right side of the vehicle body being respectively provided with at least one of the camera modules, the plurality of camera modules being capable of acquiring images around the vehicle body, and the images being capable of being displayed on the display device.

Details of one or more embodiments of the present disclosure are set forth in the following accompanying drawings and descriptions. Other features, objectives, and advantages of the present disclosure become obvious with reference to the specification, the accompanying drawings, and the claims.

BRIEF DESCRIPTION OF THE DRAWINGS

In order to better describe and illustrate embodiments and/or examples of those inventions disclosed herein, reference may be made to one or more accompanying drawings. Additional details or examples used to describe the accompanying drawings should not be considered as limitations on the scope of any of the disclosed inventions, the presently described embodiments and/or examples, and the presently understood best mode of these inventions.

DETAILED DESCRIPTION OF THE EMBODIMENTS

For easy understanding of the present disclosure, a more comprehensive description of the present disclosure is given below with reference to the accompanying drawings. Preferred embodiments of the present disclosure are given in the accompanying drawings. However, the present disclosure may be implemented in many different forms and is not limited to the embodiments described herein. On the contrary, these embodiments are provided to understand the disclosed content of the present disclosure more thoroughly and comprehensively.

It should be noted that when an element is referred to as being "fixed to" another element, it can be directly on another element or indirectly connected to another element with an intermediate element. When one element is considered to be "connected to" another element, it may be directly connected to the another element or indirectly connected to another element with an intermediate element. The terms "inside", "outside", "left", "right" and similar expressions used herein are for illustrative purposes only and are not intended to be the only means of implementation.

Figure 1:
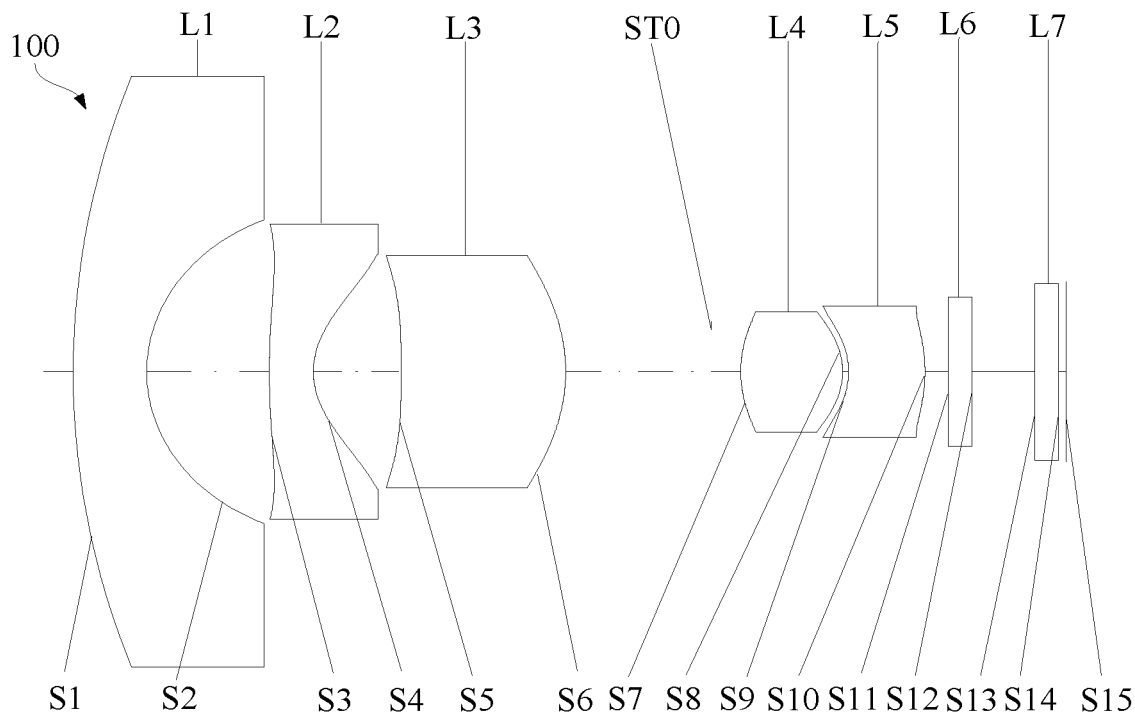
FIG. 1 is a schematic view of an optical system according to a first embodiment of the present application.

Referring to FIG. 1, an optical system 100 in an embodiment of the present application includes, sequentially from an object side to an image side: a first lens L1 having a negative refractive power, a second lens L2 having a negative refractive power, a third lens L3 having a positive refractive power, a fourth lens L4 having a positive refractive power, and a fifth lens L5 having a negative refractive power.

The first lens L1 includes an object side surface S1 and an image side surface S2. The second lens L2 includes an object side surface S3 and an image side surface S4. The third lens L3 includes an object side surface S5 and an image side surface S6. The fourth lens L4 includes an object side surface S7 and an image side surface S8. The fifth lens L5 includes an object side surface S9 and an image side surface S10. In addition, the image side of the fifth lens L5 further has an image plane S15. The image plane S15 may be a photosensitive surface of a photosensitive element.

The object side surface S1 of the first lens L1 is convex, the image side surface S2 of the first lens L1 is concave, and the image side surface S4 of the second lens L2 is concave.

In some embodiments, the object side surface S1 and the image side surface S2 of the first lens L1 are spherical, and the object side surfaces and the image side surfaces of the second lens L2, the third lens L3, the fourth lens L4, and the fifth lens L5 are aspherical. In addition to the above embodiments, both the object side surface and the image side surface of each lens may also be spherical or aspherical.

When the object side surface or the image side surface of the lens is aspherical, a formula of an aspherical surface may be referred to:

$$Z = \frac{cr^2}{1+\sqrt{1-(k+1)c^2r^2}} + \sum_i A_i r^i$$

Where Z denotes a distance from a corresponding point on an aspherical surface to a plane tangent to a surface vertex, r denotes a distance from the corresponding point on the aspherical surface to an optical axis, c denotes a curvature of a vertex of the aspherical surface, k denotes a conic constant, and Ai denotes a coefficient corresponding to a high-order term of an $i^{th}$ term in the aspherical surface shape formula.

In some embodiments, the optical system 100 further includes a stop STO. The stop STO may be arranged between the third lens L3 and the fourth lens L4. It is to be noted that, when it is described that the stop STO is arranged between the third lens L3 and the fourth lens L4, a projection of the stop STO on the optical axis may or may not overlap with a projection of the third lens L3 or the fourth lens L4 on the optical axis.

In some embodiments, the first lens L1 is made of glass, and the second lens L2, the third lens L3, the fourth lens L4, and the fifth lens L5 are made of plastic. Thus, the first lens L1, which is closest to the object side (outside), can better withstand the influence of an ambient temperature on the object side, and the optical system 100 can have lower manufacturing costs due to the other lenses being made of plastic.

In addition to the material relations of the above lenses, in some embodiments, the first lens L1, the second lens L2, the third lens L3, the fourth lens L4, and the fifth lens L5 are all made of plastic. In this case, the lenses made of plastic can reduce the weight and manufacturing costs of the optical system 100. In some embodiments, the first lens L1, the second lens L2, the third lens L3, the fourth lens L4, and the fifth lens L5 are all made of glass. In this case, the optical system 100 can withstand higher temperatures and have better optical performance.

In some embodiments, an infrared filter L6 made of glass is provided on the image side of the fifth lens L5. The infrared filter L6 includes an object side surface S11 and an image side surface S12. The infrared filter L6 is configured to filter light rays for imaging, specifically to isolate infrared light to prevent infrared light from reaching the image plane S15, so as to prevent the infrared light from affecting the color and clarity of normal images, thereby improving the imaging quality of the optical system 100. The infrared filter L6 may be assembled together with the lenses to form the optical system 100, or may be mounted between the optical system 100 and the photosensitive element when the optical system 100 and the photosensitive element are assembled into a module.

In some embodiments, a protective glass L7 is provided on the image side of the fifth lens L5. The protective glass L7 includes an object side surface S13 and an image side surface S14. Specifically, the protective glass L7 is arranged on an image side of the infrared filter L6, so as to be close to the photosensitive element during the subsequent assembly into the module, thereby protecting the photosensitive element.

In the case of enabling parameter definition and effect description of the present application to be clearer and more complete, in some embodiments, the optical system may further include elements such as a reflector, a stop, a filter, a protective glass, and a photosensitive element, in addition to the lenses with refractive powers.

In some embodiments, the optical system 100 satisfies a following relation:

(SD S2)/(RDY S2)<0.93;

where SD S2 denotes a Y-direction semi-aperture of the image side surface S2 of the first lens L1, and RDY S2 denotes a Y-radius of the image side surface S2 of the first lens L1. When the above relation is satisfied, the Y-radius and the Y-direction semi-aperture of the image side surface S2 of the first lens L1 may be reasonably matched, so as to effectively control a degree of curvature of the image side surface S2 of the first lens L1, reduce the machining difficulty of the first lens L1, and avoid the problem of uneven coating caused by an excessive degree of curvature of the first lens L1, thereby reducing a risk of producing ghosts.

In some embodiments, the optical system 100 satisfies a relation:

$$RDY\ S3/RDY\ S2<7.5;$$

where RDY S3 denotes a Y-radius of the object side surface S3 of the second lens L2. Specifically, RDY S3/RDY S2 may be −13.70, −13.65, −13.60, −5.00, −4.50, −3.00, −2.00, 4.20, 4.70, 5.00, or 5.10. The size of RDY S2 may affect the degree of curvature of the lens and a position of a ghost. The larger RDY S2, the smoother a surface of the lens, the closer the position of the ghost is to an edge. The size of RDY S3 may affect brightness of the ghost, and a size, intensity, and a shape of the ghost may change with a change of the relation between RDY S2 and RDY S3. When the above relation is satisfied, RDY S3 and RDY S2 can be reasonably configured to minimize the ghosts.

In some embodiments, when RDY S3 is negative, the optical system 100 satisfies a relation: −15.0<RDY S3/RDY S2<−7.5.

When RDY S3 is positive, the optical system 100 satisfies a relation: 3.5<RDY S3/RDY S2<5.5. When the above relations are satisfied, the size and the intensity of the ghost may be kept minimum.

In some embodiments, the optical system 100 satisfies a relation:

$$RDY\ S4/f2<-0.45;$$

where RDY S4 denotes a Y-radius of the image side surface S4 of the second lens L2, and f2 denotes a focal length of the second lens L2. Specifically, RDY S4/f2 may be −0.70, −0.68, −0.65, or −0.55. When the above relation is satisfied, the degree of curvature of the second lens L2 is reasonably controlled to further reduce the size and the intensity of the ghost.

In some embodiments, the optical system 100 satisfies a relation:

$$(\Sigma CT68/TTL)*100<20;$$

where ΣCT68 denotes a distance between the image side surface S6 of the third lens L3 and the object side surface S7 of the fourth lens L4 at the optical axis, and TTL denotes a total length of the optical system. Specifically, (ΣCT68/TTL)*100 may be 13.0, 14.0, 15.0, 16.0, 16.6, 17.0, 17.3, or 17.4. When the above relation is satisfied, thicknesses of the lenses may be controlled reasonably to effectively shorten the total length of the optical system.

In some embodiments, the optical system 100 satisfies a relation:

$$ImgH/f>1.5;$$

where ImgH denotes half of an image height of the optical system 100 in a horizontal direction, and f denotes a focal length of the optical system. Specifically, ImgH/f may be 1.83, 1.84, 1.85, 1.86, or 1.88. When the above relation is satisfied, the image height and the focal length of the optical system may be reasonably configured to reduce the influence of external conditions on the optical system and make the imaging stable. In addition, it is also conducive to the miniaturization design of the optical system.

In some embodiments, the optical system 100 satisfies a relation:

$$|Dist|<110;$$

where Dist denotes an optical distortion of the optical system, and Dist is in units of %. That is, −110%<Dist<110%. Specifically, Dist may be −108.00, −107.98, or −107.99. When the above relation is satisfied, an amount of distortion of the whole optical system may be controlled so as to reduce a widespread problem of an excessive distortion in wide-angle lenses.

In some embodiments, the optical system 100 satisfies a relation:

$$f/D\leq2.1;$$

where f denotes a focal length of the optical system, and D denotes an entrance pupil diameter of the optical system 100. When the above relation is satisfied, the optical system has an effect of a wide aperture.

In some embodiments, the optical system 100 satisfies a relation:

$$3<f45/f<4;$$

where f45 denotes a combined focal length of the fourth lens L4 and the fifth lens L5, and f denotes a focal length of the optical system. Specifically, f45/f may be 3.20, 3.25, 3.30, 3.35, 3.45, or 3.45. When the above relation is satisfied, the refractive power of the whole optical system may be reasonably distributed, which reduces the sensitivities of the fourth lens L4 and the fifth lens L5 and increases a yield.

In some embodiments, the optical system 100 satisfies a relation:

$$Nd2\leq1.55; Nd4\leq1.55; Vd2\geq54;\text{ and }Vd4\geq54;$$

where Nd2 denotes a refractive index of d-line of the second lens L2, Nd4 denotes a refractive index of d-line of the fourth lens L4, Vd2 denotes an abbe number of the second lens L2, and Vd4 denotes an abbe number of the fourth lens L4. When the above relation is satisfied, it is beneficial to correct an off-axis chromatic aberration and improve the resolution of the optical system.

In some embodiments, the optical system 100 satisfies a relation:

$$Nd3\geq1.55; Nd5\geq1.55; Vd3\leq33;\text{ and }Vd5\leq33;$$

where Nd3 denotes a refractive index of d-line of the third lens L3, Nd5 denotes a refractive index of d-line of the fifth lens L5, Vd3 denotes an abbe number of the third lens L3, and Vd5 denotes an abbe number of the fifth lens L5. When the above relation is satisfied, it is beneficial to correct an off-axis chromatic aberration and improve the resolution of the optical system.

First Embodiment

Figure 2:
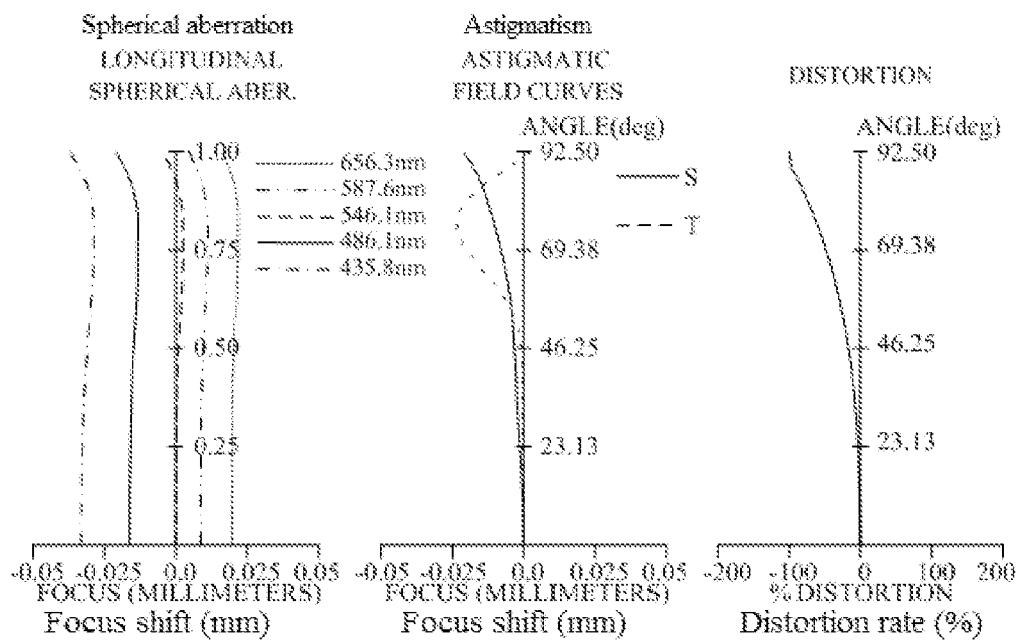
FIG. 2 shows a spherical aberration graph (mm), an astigmatism graph (mm), and a distortion graph (%) of the optical system in the first embodiment.

In the first embodiment shown in FIG. 1, an optical system 100 includes, sequentially from an object side to an image side: a first lens L1 having a negative refractive power, a second lens L2 having a negative refractive power, a third lens L3 having a positive refractive power, a stop STO, a fourth lens L4 having a positive refractive power, and a fifth lens L5 having a negative refractive power. An infrared filter L6 and a protective glass L7 are further successively provided at an image side of the fifth lens L5. FIG. 2 shows a spherical aberration graph (mm), an astigmatism graph (mm), and a distortion graph (%) of the optical system 100 in the first embodiment, in which the astigmatism and distortion graphs are data graphs at a reference wavelength. The reference wavelength in this embodiment and the following embodiments is 587.56 nm.

An object side surface S1 of the first lens L1 is convex, and an image side surface S2 of the first lens L1 is concave. An object side surface S3 of the second lens L2 is concave; and an image side surface S4 of the second lens L2 is concave. An object side surface S5 of the third lens L3 is convex, and an image side surface S6 of the third lens L3 is convex. An object side surface S7 of the fourth lens L4 is convex, and an image side surface S8 of the fourth lens L4 is convex. An object side surface S9 of the fifth lens L5 is concave, and an image side surface S10 of the fifth lens L5 is convex.

The object side surface S1 and the image side surface S2 of the first lens L1 are spherical, and the object side surfaces and the image side surfaces of the second lens L2, the third lens L3, the fourth lens L4, and the fifth lens L5 are all aspherical.

The first lens L1 is made of glass, and the second lens L2, the third lens L3, the fourth lens L4, and the fifth lens L5 are made of plastic.

The optical system 100 further satisfies the following relations:

$$(SD\ S2)/(RDY\ S2)=0.92;$$

where SD S2 denotes a Y-direction semi-aperture of the image side surface S2 of the first lens L1, and RDY S2 denotes a Y-radius of the image side surface S2 of the first lens L1. When the above relation is satisfied, the Y-radius and the Y-direction semi-aperture of the image side surface S2 of the first lens L1 may be reasonably matched, so as to effectively control a degree of curvature of the image side surface S2 of the first lens L1, reduce the machining difficulty of the first lens L1, and avoid the problem of uneven coating caused by an excessive degree of curvature of the first lens L1, thereby reducing a risk of producing ghosts.

RDY S3/RDY S2=−13.72; where RDY S3 denotes a Y-radius of the object side surface S3 of the second lens L2. The size of RDY S2 may affect the degree of curvature of the lens and a position of a ghost. The larger RDY S2, the smoother a surface of the lens, the closer the position of the ghost is to an edge. The size of RDY S3 may affect brightness of the ghost, and a size, intensity, and a shape of the ghost may change with a change of the relation between RDY S2 and RDY S3. When the above relation is satisfied, RDY S3 and RDY S2 can be reasonably configured to minimize the ghosts and keep the size and the intensity of the ghost minimum.

RDY S4/f2=−0.56; where RDY S4 denotes a Y-radius of the image side surface S4 of the second lens L2, and f2 denotes a focal length of the second lens L2. When the above relation is satisfied, the degree of curvature of the second lens L2 is reasonably controlled to further reduce the size and the intensity of the ghost.

(ΣCT68/TTL)*100=12.9; where ΣCT68 denotes a distance between the image side surface S6 of the third lens L3 and the object side surface S7 of the fourth lens L4 at the optical axis, and TTL denotes a total length of the optical system. When the above relation is satisfied, thicknesses of the lenses may be controlled reasonably to effectively shorten the total length of the optical system.

ImgH/f=1.86; where ImgH denotes half of an image height of the optical system 100 in a horizontal direction, and f denotes a focal length of the optical system. When the above relation is satisfied, the image height and the focal length of the optical system may be reasonably configured to reduce the influence of external conditions on the optical system and make the imaging stable. In addition, it is also conducive to the miniaturization design of the optical system.

Dist=−108; where Dist denotes an optical distortion of the optical system, and Dist is in units of %. When the above relation is satisfied, an amount of distortion of the whole optical system may be controlled so as to reduce a widespread problem of an excessive distortion in wide-angle lenses.

f/D=2.1; where f denotes a focal length of the optical system, and D denotes an entrance pupil diameter of the optical system 100. When the above relation is satisfied, the optical system has an effect of a wide aperture.

f45/f=3.19; where f45 denotes a combined focal length of the fourth lens L4 and the fifth lens L5, and f denotes a focal length of the optical system. When the above relation is satisfied, the refractive power of the whole optical system may be reasonably distributed, which reduces the sensitivities of the fourth lens L4 and the fifth lens L5 and increases a yield.

Nd2=1.545; Nd4=1.545; Vd2=56.00; and Vd4=56.00; where Nd2 denotes a refractive index of d-line of the second lens L2, Nd4 denotes a refractive index of d-line of the fourth lens L4, Vd2 denotes an abbe number of the second lens L2, and Vd4 denotes an abbe number of the fourth lens L4. When the above relation is satisfied, it is beneficial to correct an off-axis chromatic aberration and improve the resolution of the optical system.

Nd3=1.661; Nd5=1.661; Vd3=20.37; and Vd5=20.37; where Nd3 denotes a refractive index of d-line of the third lens L3, Nd5 denotes a refractive index of d-line of the fifth lens L5, Vd3 denotes an abbe number of the third lens L3, and Vd5 denotes an abbe number of the fifth lens L5. When the above relation is satisfied, it is beneficial to correct an off-axis chromatic aberration and improve the resolution of the optical system.

In the first embodiment, a focal length of the optical system is denoted by f, and f=0.965 mm. An f-number is denoted by FNO, and FNO=2.1. Half of a field of view in a horizontal direction is denoted by (½) FOV, and (½) FOV=92.5° (deg.).

In addition, various parameters of the optical system 100 are given in Table 1 and Table 2. The elements from an object plane to an image plane S15 are sequentially arranged in order of the elements from top to bottom in Table 1. Surface numbers 1 and 2 are the object side surface S1 and the image side surface S2 of the first lens L1, respectively. That is, in a same lens, a surface with a smaller surface number is an object side surface, and a surface with a larger surface number is an image side surface. The Y-radius in Table 1 is a radius of curvature of the object side surface or the image side surface with the corresponding surface number in a paraxial region. In the "thickness" parameter column of the first lens L1, the first value is a thickness of the lens on the optical axis, and the second value is a distance from the image side surface of the lens to the object side surface of the following lens on the optical axis. The "thickness" parameter in the surface number 6 is a distance from the image side surface S6 of the third lens L3 to the stop STO. The value of the stop STO in the "thickness" parameter column is a distance from the stop STO to a vertex (the vertex refers to an intersection between the lens and the optical axis) of the object side surface of the following lens on the optical axis. A direction from the object side surface of the first lens to the image side surface of the last lens is a positive direction of the optical axis by default. When the value is negative, it indicates that the stop STO is arranged on the right side of the vertex of the object side surface of the lens. When the "thickness" parameter of the stop STO is positive, the stop STO is arranged on the left side of the vertex of the object side surface of the lens. The "thickness" parameter value in the surface number 11 is a distance from the image side surface S10 of the fifth lens L5 to the object side surface S11 of the infrared filter L6 on the optical axis. The value corresponding to the surface number 13 of the infrared filter L6 (the filter in Table 1) in the "thickness" parameter is a distance from the image side surface S12 of the infrared filter L6 to the object side surface S13 of the protective glass L7 on the optical axis. Table 2 is a table of parameters related to the aspherical surface of each lens in Table 1, where K denotes a conic constant and Ai denotes a coefficient corresponding to a high-order term of an $i^{th}$ term in an aspherical surface shape formula.

In addition, in the following embodiments, refractive indexes and focal lengths of the lenses are values at a reference wavelength. The reference wavelength is 587.56 nm

TABLE 1

First embodiment
f = 0.965 mm, FNO = 2.1, (1/2)FOV = 92.5°

| Surface number | Surface name | Surface type | Y-radius (mm) | Thickness (mm) | Material | Refractive index | Abbe number | Focal length (mm) |
|---|---|---|---|---|---|---|---|---|
| 1 | First lens | Spherical | 16.00 | 1.250 | Glass | 1.773 | 49.62 | −5.554 |
| 2 | | Spherical | 3.280 | 2.406 | | | | |
| 3 | Second lens | Aspherical | −45.00 | 0.800 | Plastic | 1.545 | 56.00 | −2.405 |
| 4 | | Aspherical | 1.363 | 0.877 | | | | |
| 5 | Third lens | Aspherical | 4.109 | 3.500 | Plastic | 1.661 | 20.37 | 4.875 |
| 6 | | Aspherical | −10.41 | 1.528 | | | | |
| 7 | Stop | Spherical | Infinite | 0.650 | | | | |
| 8 | Fourth lens | Aspherical | 2.269 | 1.764 | Plastic | 1.545 | 56.00 | 2.003 |
| 9 | | Aspherical | −1.535 | 0.070 | | | | |
| 10 | Fifth lens | Aspherical | −1.748 | 1.654 | Plastic | 1.661 | 20.37 | −8.823 |
| 11 | | Aspherical | −3.425 | 0.400 | | | | |
| 12 | Infrared | Spherical | Infinite | 0.400 | Glass | 1.523 | 55.00 | |
| 13 | filter | Spherical | Infinite | 1.075 | | | | |
| 14 | Protective | Spherical | Infinite | 0.400 | Glass | 1.523 | 55.00 | |
| 15 | glass | Spherical | Infinite | 0.125 | | | | |
| 16 | Image plane | Spherical | Infinite | 0.000 | | | | |

TABLE 2

First embodiment

| Surface number | 1 | 2 | 3 | 4 | 5 |
|---|---|---|---|---|---|
| K | 0.00E+00 | 0.00E+00 | 0.00E+00 | −7.90E−01 | 1.81E+00 |
| A4 | 0.00E+00 | 0.00E+00 | −2.72E−04 | −3.98E−02 | −1.40E−02 |
| A6 | 0.00E+00 | 0.00E+00 | −4.60E−04 | 9.05E−03 | 4.60E−03 |
| A8 | 0.00E+00 | 0.00E+00 | 2.53E−05 | −2.37E−03 | −7.60E−04 |
| A10 | 0.00E+00 | 0.00E+00 | −2.04E−09 | 1.59E−04 | −6.05E−06 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

| Surface number | 6 | 8 | 9 | 10 | 11 |
|---|---|---|---|---|---|
| K | 2.93E+01 | 0.00E+00 | 0.00E+00 | 3.29E−01 | 0.00E+00 |
| A4 | 3.96E−03 | −1.81E−03 | 5.13E−02 | 7.34E−03 | 4.54E−03 |
| A6 | 4.10E−03 | 1.64E−03 | 1.83E−02 | 1.64E−02 | 3.96E−03 |
| A8 | −1.44E−03 | 0.00E+00 | 0.00E+00 | 7.78E−03 | 7.45E−04 |
| A10 | 3.06E−04 | 0.00E+00 | 0.00E+00 | −3.03E−03 | 2.89E−04 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

Second Embodiment

Figure 3:
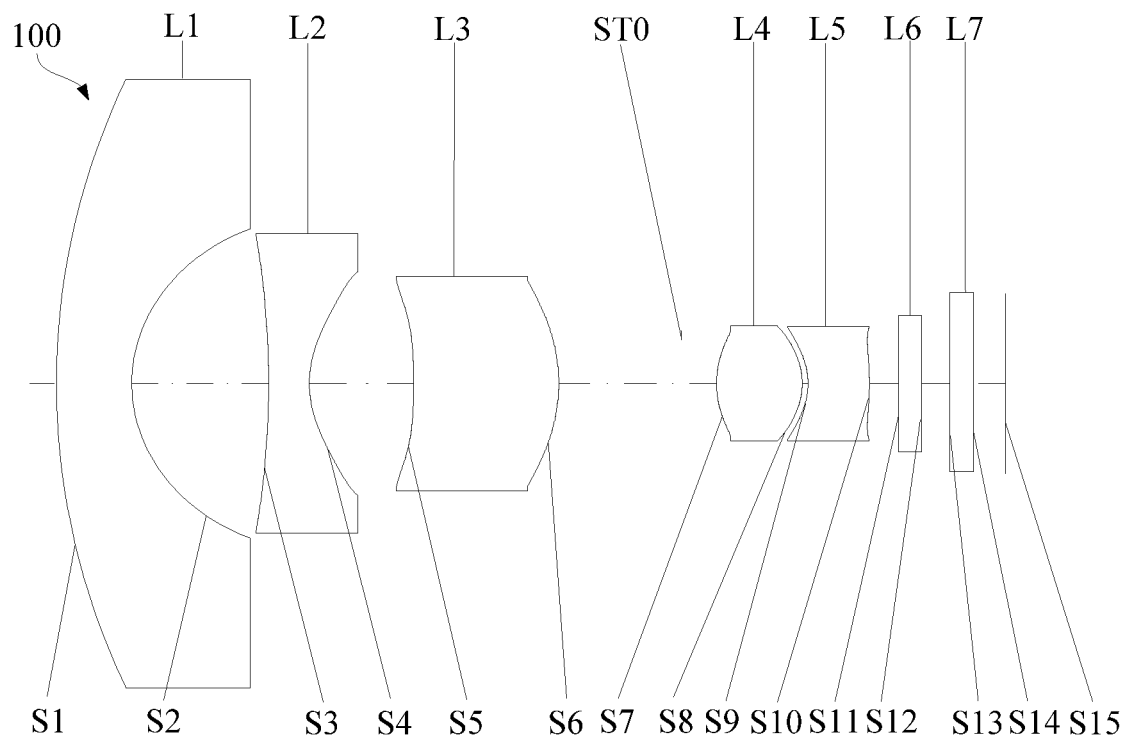
FIG. 3 is a schematic view of an optical system according to a second embodiment of the present application.
Figure 4:
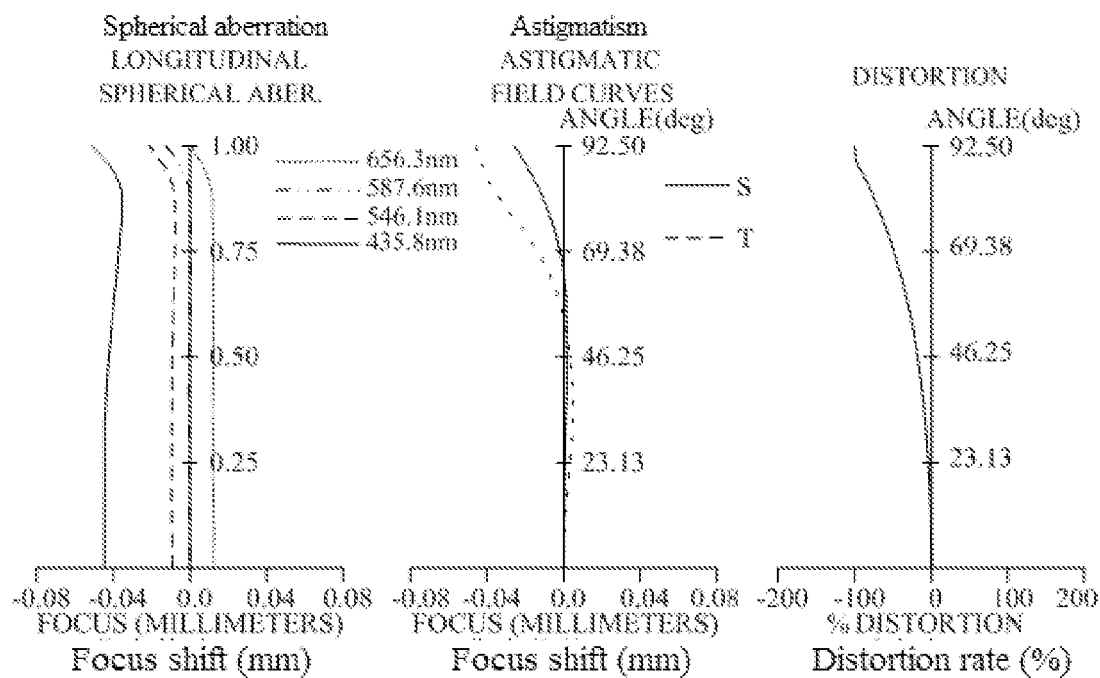
FIG. 4 shows a spherical aberration graph (mm), an astigmatism graph (mm), and a distortion graph (%) of the optical system in the second embodiment.

In the second embodiment shown in FIG. 3, an optical system 100 includes, sequentially from an object side to an image side: a first lens L1 having a negative refractive power, a second lens L2 having a negative refractive power, a third lens L3 having a positive refractive power, a stop STO, a fourth lens L4 having a positive refractive power, and a fifth lens L5 having a negative refractive power. An infrared filter L6 and a protective glass L7 are further successively provided at an image side of the fifth lens L5. FIG. 4 shows a spherical aberration graph (mm), an astigmatism graph (mm), and a distortion graph (%) of the optical system 100 in the second embodiment, in which the astigmatism and distortion graphs are data graphs at a reference wavelength.

An object side surface S1 of the first lens L1 is convex, and an image side surface S2 of the first lens L1 is concave. An object side surface S3 of the second lens L2 is concave; and an image side surface S4 of the second lens L2 is concave. An object side surface S5 of the third lens L3 is concave, and an image side surface S6 of the third lens L3 is convex. An object side surface S7 of the fourth lens L4 is convex, and an image side surface S8 of the fourth lens L4 is convex. An object side surface S9 of the fifth lens L5 is concave, and an image side surface S10 of the fifth lens L5 is convex.

The object side surface S1 and the image side surface S2 of the first lens L1 are spherical, and the object side surfaces and the image side surfaces of the second lens L2, the third lens L3, the fourth lens L4, and the fifth lens L5 are all aspherical.

The first lens L1 is made of glass, and the second lens L2, the third lens L3, the fourth lens L4, and the fifth lens L5 are made of plastic.

In the second embodiment, a focal length of the optical system is denoted by f, and f=0.975 mm. An f-number is denoted by FNO, and FNO=2.1. Half of a field of view in a horizontal direction is denoted by (½) FOV, and (½) FOV=92.5° (deg.).

In addition, parameters of the optical system 100 are given in Table 3 and Table 4, and definitions of the parameters may be obtained from the first embodiment, which are not described in detail herein.

TABLE 3

Second embodiment
f = 0.975 mm, FNO = 2.1, (1/2)FOV = 92.5°

| Surface number | Surface name | Surface type | Y-radius (mm) | Thickness (mm) | Material | Refractive index | Abbe number | Focal length (mm) |
|---|---|---|---|---|---|---|---|---|
| 1 | First lens | Spherical | 16.00 | 1.300 | Glass | 1.773 | 49.62 | −5.749 |
| 2 | | Spherical | 3.353 | 2.359 | | | | |
| 3 | Second lens | Aspherical | −15.99 | 0.700 | Plastic | 1.545 | 56.00 | −3.752 |
| 4 | | Aspherical | 2.376 | 1.800 | | | | |
| 5 | Third lens | Aspherical | −15.346 | 2.500 | Plastic | 1.661 | 20.37 | 7.577 |
| 6 | | Aspherical | −4.02 | 2.116 | | | | |
| 7 | Stop | Spherical | Infinite | 0.606 | | | | |
| 8 | Fourth lens | Aspherical | 2.138 | 1.479 | Plastic | 1.545 | 56.00 | 1.911 |
| 9 | | Aspherical | −1.531 | 0.100 | | | | |
| 10 | Fifth lens | Aspherical | −1.543 | 1.060 | Plastic | 1.661 | 20.37 | −3.854 |
| 11 | | Aspherical | −4.983 | 0.500 | | | | |
| 12 | Infrared | Spherical | Infinite | 0.400 | Glass | 1.523 | 55.00 | |
| 13 | filter | Spherical | Infinite | 0.500 | | | | |
| 14 | Protective | Spherical | Infinite | 0.400 | Glass | 1.523 | 55.00 | |
| 15 | glass | Spherical | Infinite | 0.543 | | | | |
| 16 | Image plane | Spherical | Infinite | 0.000 | | | | |

TABLE 4

Second embodiment

| Surface number | 1 | 2 | 3 | 4 | 5 |
|---|---|---|---|---|---|
| K | 0.00E+00 | 0.00E+00 | 0.00E+00 | 0.00E+00 | 0.00E+00 |
| A4 | 0.00E+00 | 0.00E+00 | 3.37E−03 | −2.30E−02 | −1.87E−02 |
| A6 | 0.00E+00 | 0.00E+00 | −5.47E−04 | −1.74E−05 | 1.41E−03 |
| A8 | 0.00E+00 | 0.00E+00 | 2.69E−05 | −2.55E−04 | 1.70E−04 |
| A10 | 0.00E+00 | 0.00E+00 | 1.97E−07 | 2.60E−06 | 1.20E−05 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

| Surface number | 6 | 8 | 9 | 10 | 11 |
|---|---|---|---|---|---|
| K | 4.12E−01 | 0.00E+00 | 0.00E+00 | 0.00E+00 | 0.00E+00 |
| A4 | −2.75E−03 | −6.21E−03 | 7.59E−02 | 8.21E−02 | 5.36E−02 |
| A6 | 1.96E−03 | −1.03E−02 | −2.55E−02 | −2.68E−04 | 1.52E−02 |
| A8 | −2.46E−04 | 4.73E−03 | 1.01E−03 | −1.68E−02 | −5.15E−03 |

TABLE 4-continued

| | | Second embodiment | | | |
|---|---|---|---|---|---|
| A10 | 2.28E−05 | −9.49E−03 | 3.45E−03 | 1.47E−02 | 5.06E−03 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

According to the parameter information provided above, the following data may be deduced.

| | Second embodiment | | |
|---|---|---|---|
| f (mm) | 0.975 | (ΣCT68/TTL)*100 | 16.5 |
| FNO | 2.1 | ImgH/f | 1.84 |
| (½) FOV (deg.) | 92.5 | Dist (%) | −107.98 |
| RDY S3/RDY S2 | −4.74 | f/D | 2.1 |
| (SD S2)/(RDY S2) | 0.92 | f45/f | 3.45 |
| RDY S4/f2 | −0.63 | | |

Third Embodiment

Figure 5:
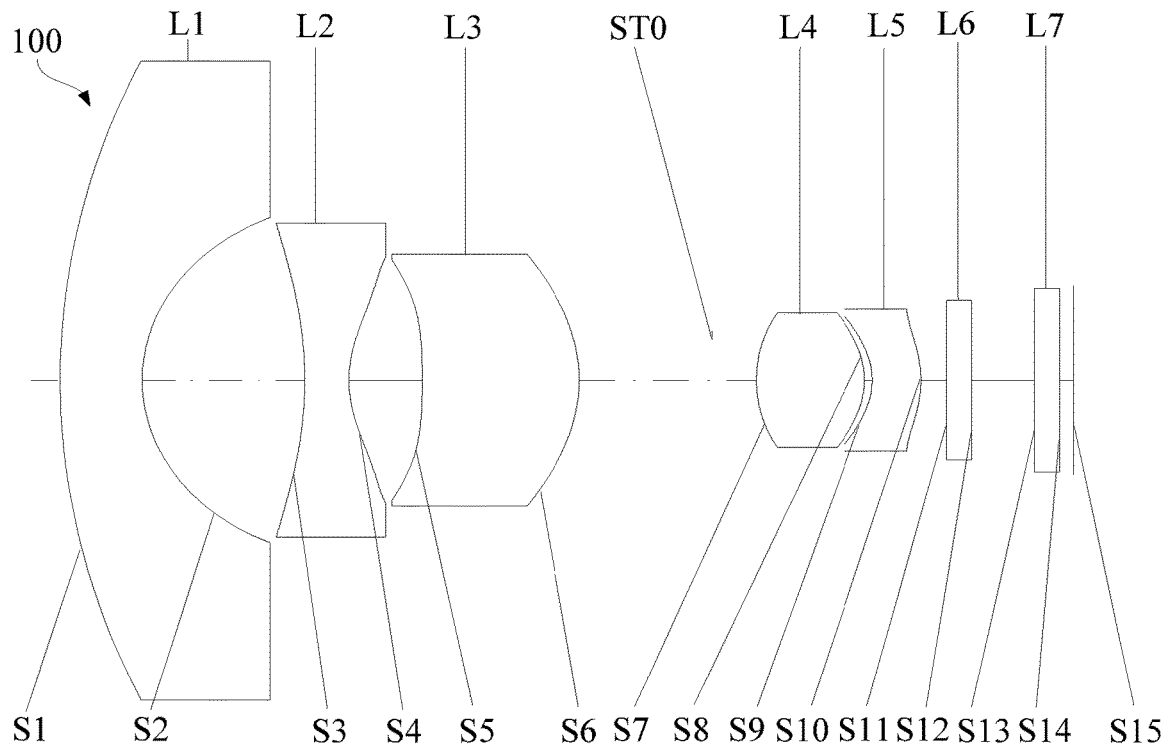
FIG. 5 is a schematic view of an optical system according to a third embodiment of the present application.
Figure 6:
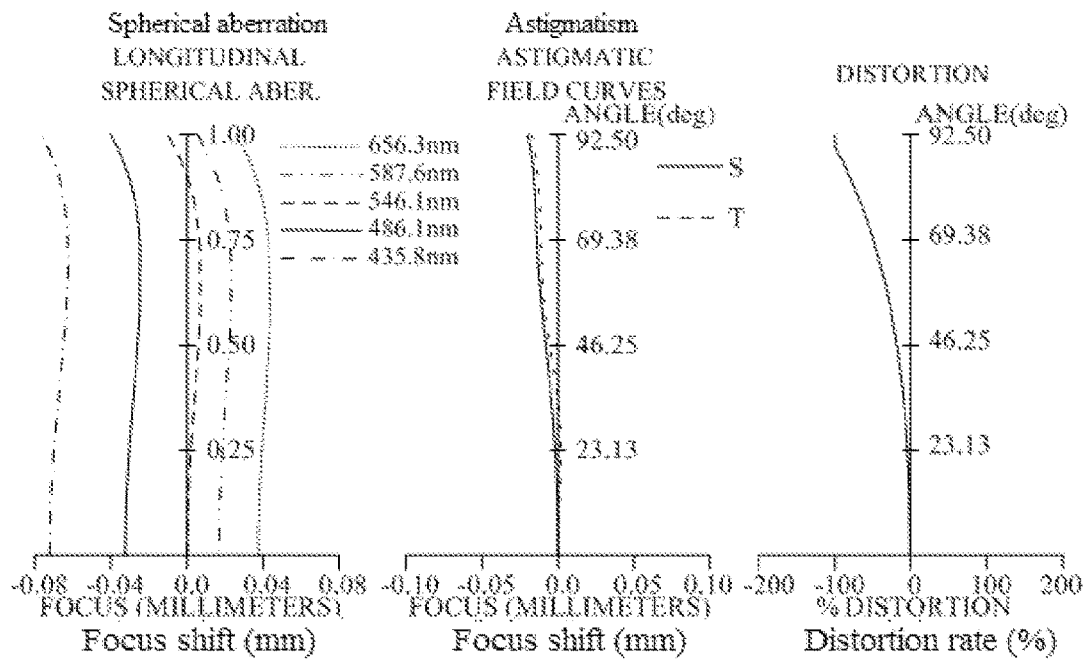
FIG. 6 shows a spherical aberration graph (mm), an astigmatism graph (mm), and a distortion graph (%) of the optical system in the third embodiment.

In the third embodiment shown in FIG. 5, an optical system 100 includes, sequentially from an object side to an image side: a first lens L1 having a negative refractive power, a second lens L2 having a negative refractive power, a third lens L3 having a positive refractive power, a stop STO, a fourth lens L4 having a positive refractive power, and a fifth lens L5 having a negative refractive power. An infrared filter L6 and a protective glass L7 are further successively provided at an image side of the fifth lens L5. FIG. 6 shows a spherical aberration graph (mm), an astigmatism graph (mm), and a distortion graph (%) of the optical system 100 in the third embodiment, in which the astigmatism and distortion graphs are data graphs at a reference wavelength.

An object side surface S1 of the first lens L1 is convex, and an image side surface S2 of the first lens L1 is concave. An object side surface S3 of the second lens L2 is concave; and an image side surface S4 of the second lens L2 is concave. An object side surface S5 of the third lens L3 is concave, and an image side surface S6 of the third lens L3 is convex. An object side surface S7 of the fourth lens L4 is convex, and an image side surface S8 of the fourth lens L4 is convex. An object side surface S9 of the fifth lens L5 is concave, and an image side surface S10 of the fifth lens L5 is convex.

The object side surface S1 and the image side surface S2 of the first lens L1 are spherical, and the object side surfaces and the image side surfaces of the second lens L2, the third lens L3, the fourth lens L4, and the fifth lens L5 are all aspherical.

The first lens L1 is made of glass, and the second lens L2, the third lens L3, the fourth lens L4, and the fifth lens L5 are made of plastic.

In the third embodiment, a focal length of the optical system is denoted by f, and f=0.98 mm. An f-number is denoted by FNO, and FNO=2.1. Half of a field of view in a horizontal direction is denoted by (½) FOV, and (½) FOV=92.5° (deg.).

In addition, parameters of the optical system 100 are given in Table 5 and Table 6, and definitions of the parameters may be obtained from the first embodiment, which are not described in detail herein.

TABLE 5

Third embodiment
f = 0.98 mm, FNO = 2.1, (1/2)FOV = 92.5°

| Surface number | Surface name | Surface type | Y-radius (mm) | Thickness (mm) | Material | Refractive index | Abbe number | Focal length (mm) |
|---|---|---|---|---|---|---|---|---|
| 1 | First lens | Spherical | 15.00 | 1.300 | Glass | 1.773 | 49.62 | −5.836 |
| 2 | | Spherical | 3.348 | 2.589 | | | | |
| 3 | Second lens | Aspherical | −8.92 | 0.700 | Plastic | 1.545 | 56.00 | −3.619 |
| 4 | | Aspherical | 2.611 | 1.163 | | | | |
| 5 | Third lens | Aspherical | −15.961 | 2.500 | Plastic | 1.661 | 20.37 | 5.893 |
| 6 | | Aspherical | −3.36 | 2.101 | | | | |
| 7 | Stop | Spherical | Infinite | 0.705 | | | | |
| 8 | Fourth lens | Aspherical | 2.678 | 1.728 | Plastic | 1.545 | 56.00 | 2.199 |
| 9 | | Aspherical | −1.682 | 0.124 | | | | |
| 10 | Fifth lens | Aspherical | −1.529 | 0.772 | Plastic | 1.661 | 20.37 | −8.927 |
| 11 | | Aspherical | −2.472 | 0.400 | | | | |
| 12 | Infrared | Spherical | Infinite | 0.400 | Glass | 1.523 | 55.00 | |
| 13 | filter | Spherical | Infinite | 1.000 | | | | |
| 14 | Protective | Spherical | Infinite | 0.400 | Glass | 1.523 | 55.00 | |
| 15 | glass | Spherical | Infinite | 0.221 | | | | |
| 16 | Image plane | Spherical | Infinite | 0.000 | | | | |

TABLE 6

Third embodiment

| Surface number | 1 | 2 | 3 | 4 | 5 |
|---|---|---|---|---|---|
| K | 0.00E+00 | 0.00E+00 | 0.00E+00 | 0.00E+00 | 0.00E+00 |
| A4 | 0.00E+00 | 0.00E+00 | 4.61E−05 | −2.89E−02 | −1.36E−02 |
| A6 | 0.00E+00 | 0.00E+00 | 7.85E−05 | 1.26E−05 | −1.49E−03 |
| A8 | 0.00E+00 | 0.00E+00 | 0.00E+00 | 0.00E+00 | 5.34E−04 |
| A10 | 0.00E+00 | 0.00E+00 | 0.00E+00 | 0.00E+00 | −3.21E−05 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

| Surface number | 6 | 8 | 9 | 10 | 11 |
|---|---|---|---|---|---|
| K | −6.97E−01 | 0.00E+00 | 0.00E+00 | 0.00E+00 | 0.00E+00 |
| A4 | 1.86E−03 | 1.31E−03 | 5.55E−02 | 5.76E−02 | 3.87E−02 |
| A6 | −2.36E−04 | 2.39E−03 | 0.00E+00 | 9.31E−03 | 6.85E−04 |
| A8 | 6.63E−05 | 0.00E+00 | 0.00E+00 | 1.87E−03 | 6.28E−03 |
| A10 | −6.01E−06 | 0.00E+00 | 0.00E+00 | −1.07E−03 | −1.46E−03 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

According to the parameter information provided above, the following data may be deduced.

| Third embodiment | | | |
|---|---|---|---|
| f (mm) | 0.98 | (ΣCT68/TTL)*100 | 17.5 |
| FNO | 2.1 | ImgH/f | 1.83 |
| (½) FOV (deg.) | 92.5 | Dist (%) | −108 |
| RDY S3/RDY S2 | −2.66 | f/D | 2.1 |
| (SD S2)/(RDY S2) | 0.919 | f45/f | 3.21 |
| RDY S4/f2 | −0.72 | | |

Fourth Embodiment

Figure 7:
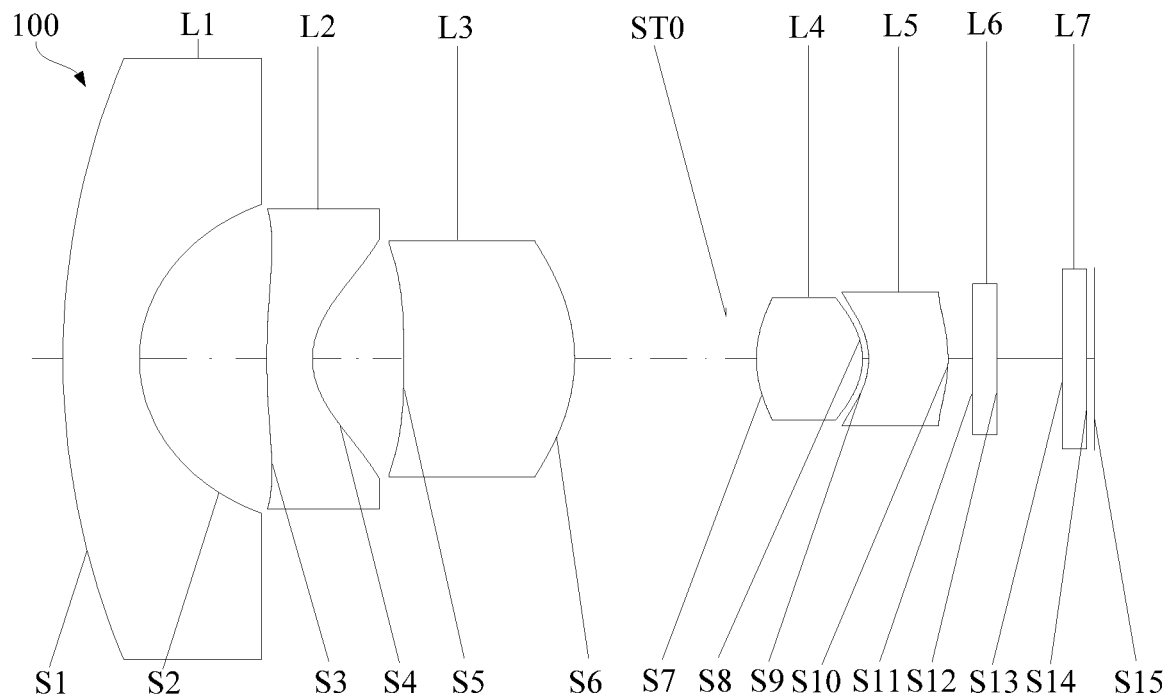
FIG. 7 is a schematic view of an optical system according to a fourth embodiment of the present application.
Figure 8:
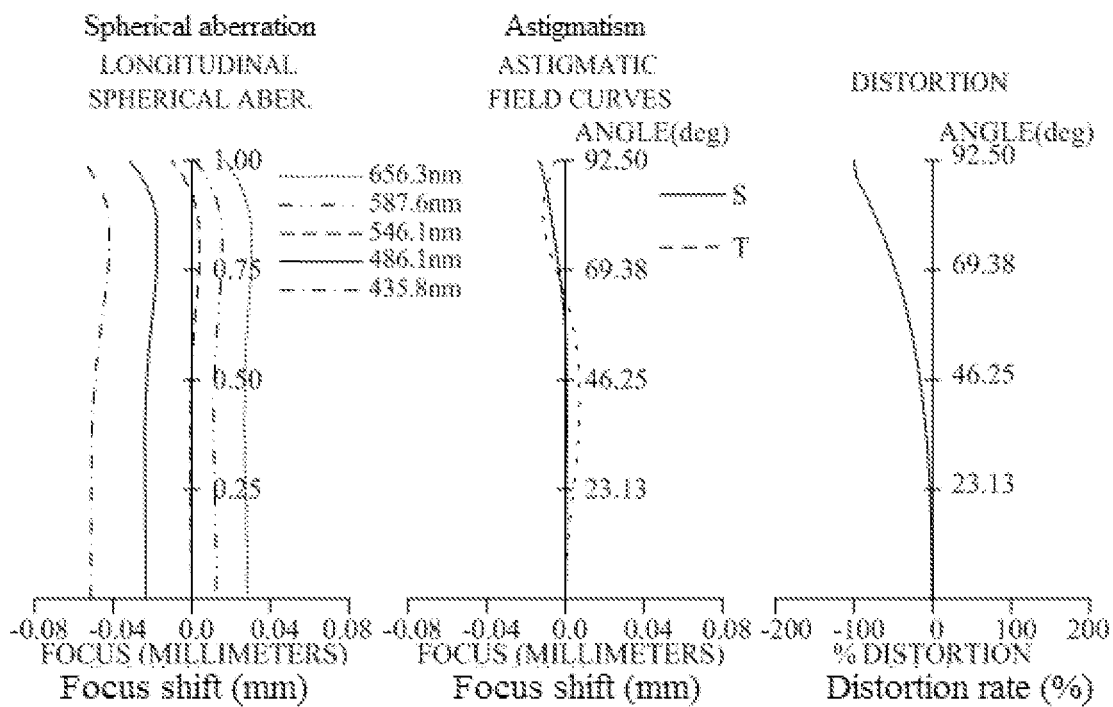
FIG. 8 shows a spherical aberration graph (mm), an astigmatism graph (mm), and a distortion graph (%) of the optical system in the fourth embodiment.

In the fourth embodiment shown in FIG. 7, an optical system 100 includes, sequentially from an object side to an image side: a first lens L1 having a negative refractive power, a second lens L2 having a negative refractive power, a third lens L3 having a positive refractive power, a stop STO, a fourth lens L4 having a positive refractive power, and a fifth lens L5 having a negative refractive power. An infrared filter L6 and a protective glass L7 are further successively provided at an image side of the fifth lens L5. FIG. 8 shows a spherical aberration graph (mm), an astigmatism graph (mm), and a distortion graph (%) of the optical system 100 in the fourth embodiment, in which the astigmatism and distortion graphs are data graphs at a reference wavelength.

An object side surface S1 of the first lens L1 is convex, and an image side surface S2 of the first lens L1 is concave. An object side surface S3 of the second lens L2 is convex; and an image side surface S4 of the second lens L2 is concave. An object side surface S5 of the third lens L3 is concave, and an image side surface S6 of the third lens L3 is convex. An object side surface S7 of the fourth lens L4 is convex, and an image side surface S8 of the fourth lens L4 is convex. An object side surface S9 of the fifth lens L5 is concave, and an image side surface S10 of the fifth lens L5 is convex.

The object side surface S1 and the image side surface S2 of the first lens L1 are spherical, and the object side surfaces and the image side surfaces of the second lens L2, the third lens L3, the fourth lens L4, and the fifth lens L5 are all aspherical.

The first lens L1 is made of glass, and the second lens L2, the third lens L3, the fourth lens L4, and the fifth lens L5 are made of plastic.

In the fourth embodiment, a focal length of the optical system is denoted by f, and f=0.952 mm. An f-number is denoted by FNO, and FNO=2.1. Half of a field of view in a horizontal direction is denoted by (½) FOV, and (½) FOV=92.5° (deg.).

In addition, parameters of the optical system 100 are given in Table 7 and Table 8, and definitions of the parameters may be obtained from the first embodiment, which are not described in detail herein.

TABLE 7

Fourth embodiment
f = 0.952 mm, FNO = 2.1, (1/2)FOV = 92.5°

| Surface number | Surface name | Surface type | Y-radius (mm) | Thickness (mm) | Material | Refractive index | Abbe number | Focal length (mm) |
|---|---|---|---|---|---|---|---|---|
| 1 | First lens | Spherical | 18.00 | 1.250 | Glass | 1.773 | 49.62 | −5.386 |
| 2 | | Spherical | 3.290 | 2.085 | | | | |

TABLE 7-continued

Fourth embodiment
f = 0.952 mm, FNO = 2.1, (1/2)FOV = 92.5°

| Surface number | Surface name | Surface type | Y-radius (mm) | Thickness (mm) | Material | Refractive index | Abbe number | Focal length (mm) |
|---|---|---|---|---|---|---|---|---|
| 3 | Second lens | Aspherical | 16.94 | 0.750 | Plastic | 1.545 | 56.00 | −3.474 |
| 4 | | Aspherical | 1.680 | 1.495 | | | | |
| 5 | Third lens | Aspherical | −50.000 | 2.800 | Plastic | 1.661 | 20.37 | 6.520 |
| 6 | | Aspherical | −4.10 | 2.481 | | | | |
| 7 | Stop | Spherical | Infinite | 0.500 | | | | |
| 8 | Fourth lens | Aspherical | 2.656 | 1.737 | Plastic | 1.545 | 56.00 | 2.145 |
| 9 | | Aspherical | −1.612 | 0.100 | | | | |
| 10 | Fifth lens | Aspherical | −1.809 | 1.302 | Plastic | 1.661 | 20.37 | −7.562 |
| 11 | | Aspherical | −3.629 | 0.400 | | | | |
| 12 | Infrared | Spherical | Infinite | 0.400 | Glass | 1.523 | 55.00 | |
| 13 | filter | Spherical | Infinite | 1.075 | | | | |
| 14 | Protective | Spherical | Infinite | 0.400 | Glass | 1.523 | 55.00 | |
| 15 | glass | Spherical | Infinite | 0.125 | | | | |
| 16 | Image plane | Spherical | Infinite | 0.000 | | | | |

TABLE 8

Fourth embodiment

| Surface number | 1 | 2 | 3 | 4 | 5 |
|---|---|---|---|---|---|
| K | 0.00E+00 | 0.00E+00 | 1.35E+01 | −6.96E−01 | 4.51E+01 |
| A4 | 0.00E+00 | 0.00E+00 | −7.16E−04 | −2.47E−02 | −1.33E−02 |
| A6 | 0.00E+00 | 0.00E+00 | −5.95E−04 | 3.41E−04 | 2.19E−03 |
| A8 | 0.00E+00 | 0.00E+00 | 3.74E−05 | −5.06E−04 | −3.59E−04 |
| A10 | 0.00E+00 | 0.00E+00 | −9.64E−07 | 5.02E−05 | 3.33E−05 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

| Surface number | 6 | 8 | 9 | 10 | 11 |
|---|---|---|---|---|---|
| K | −9.66E−02 | 0.00E+00 | 0.00E+00 | 2.17E−01 | 0.00E+00 |
| A4 | −6.79E−04 | −3.40E−03 | 1.15E−02 | −1.29E−02 | 1.32E−02 |
| A6 | 8.20E−04 | −6.73E−03 | 2.42E−02 | 2.81E−02 | 4.91E−03 |
| A8 | −1.03E−04 | 0.00E+00 | 0.00E+00 | 1.52E−02 | 2.49E−03 |
| A10 | 7.94E−06 | 0.00E+00 | 0.00E+00 | −5.19E−03 | 5.69E−04 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

According to the parameter information provided above, the following data may be deduced.

| Fourth embodiment | | | |
|---|---|---|---|
| f (mm) | 0.952 | (ΣCT68/TTL)*100 | 17.6 |
| FNO | 2.1 | ImgH/f | 1.89 |
| (½) FOV (deg.) | 92.5 | Dist (%) | −108 |
| RDY S3/RDY S2 | 5.15 | f/D | 2.1 |
| (SD S2)/(RDY S2) | 0.92 | f45/f | 3.46 |
| RDY S4/f2 | −0.48 | | |

Fifth Embodiment

Figure 9:
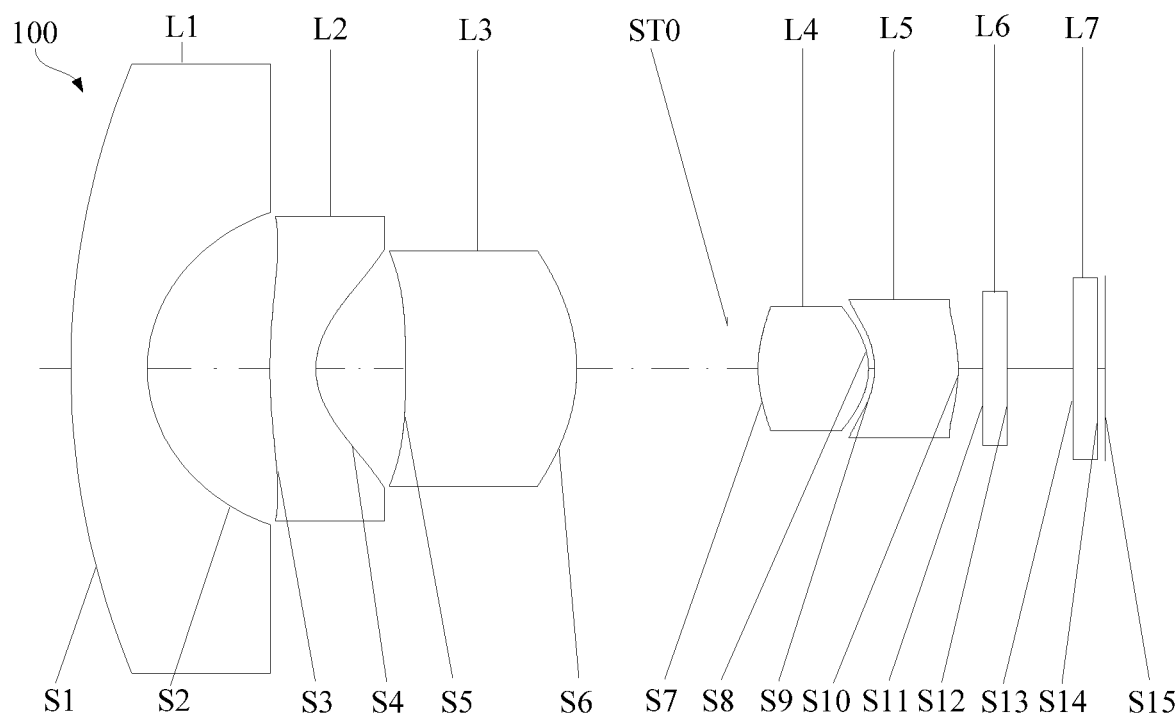
FIG. 9 is a schematic view of an optical system according to a fifth embodiment of the present application.
Figure 10:
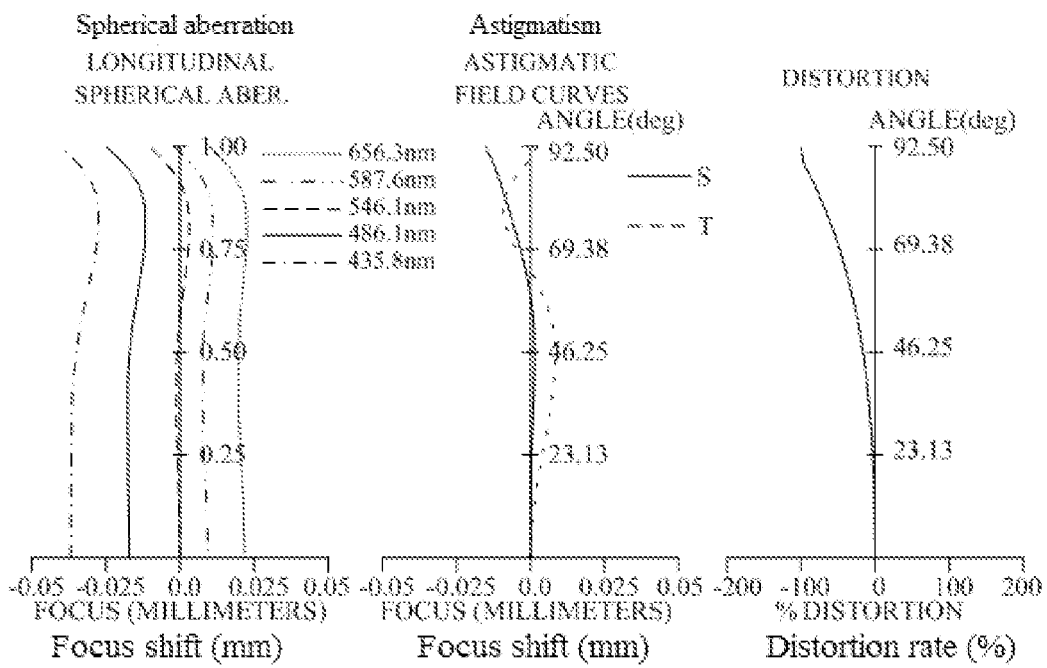
FIG. 10 shows a spherical aberration graph (mm), an astigmatism graph (mm), and a distortion graph (%) of the optical system in the fifth embodiment.

In the fifth embodiment shown in FIG. 9, an optical system 100 includes, sequentially from an object side to an image side: a first lens L1 having a negative refractive power, a second lens L2 having a negative refractive power, a third lens L3 having a positive refractive power, a stop STO, a fourth lens L4 having a positive refractive power, and a fifth lens L5 having a negative refractive power. An infrared filter L6 and a protective glass L7 are further successively provided at an image side of the fifth lens L5. FIG. 10 shows a spherical aberration graph (mm), an astigmatism graph (mm), and a distortion graph (%) of the optical system 100 in the fifth embodiment, in which the astigmatism and distortion graphs are data graphs at a reference wavelength.

An object side surface S1 of the first lens L1 is convex, and an image side surface S2 of the first lens L1 is concave. An object side surface S3 of the second lens L2 is convex; and an image side surface S4 of the second lens L2 is concave. An object side surface S5 of the third lens L3 is concave, and an image side surface S6 of the third lens L3 is convex. An object side surface S7 of the fourth lens L4 is convex, and an image side surface S8 of the fourth lens L4 is convex. An object side surface S9 of the fifth lens L5 is concave, and an image side surface S10 of the fifth lens L5 is convex.

The object side surface S1 and the image side surface S2 of the first lens L1 are spherical, and the object side surfaces and the image side surfaces of the second lens L2, the third lens L3, the fourth lens L4, and the fifth lens L5 are all aspherical.

The first lens L1 is made of glass, and the second lens L2, the third lens L3, the fourth lens L4, and the fifth lens L5 are made of plastic.

In the fifth embodiment, a focal length of the optical system is denoted by f, and f=0.960 mm. An f-number is denoted by FNO, and FNO=2.1. Half of a field of view in a horizontal direction is denoted by (½) FOV, and (½) FOV=92.5° (deg.).

In addition, parameters of the optical system 100 are given in Table 9 and Table 10, and definitions of the parameters may be obtained from the first embodiment, which are not described in detail herein.

TABLE 9

Fifth embodiment
f = 0.960 mm, FNO = 2.1, (1/2)FOV = 92.5°

| Surface number | Surface name | Surface type | Y-radius (mm) | Thickness (mm) | Material | Refractive index | Abbe number | Focal length (mm) |
|---|---|---|---|---|---|---|---|---|
| 1 | First lens | Spherical | 18.00 | 1.250 | Glass | 1.773 | 49.62 | −5.376 |
| 2 | | Spherical | 3.285 | 2.003 | | | | |
| 3 | Second lens | Aspherical | 13.31 | 0.750 | Plastic | 1.545 | 56.00 | −3.557 |
| 4 | | Aspherical | 1.662 | 1.465 | | | | |
| 5 | Third lens | Aspherical | −50.000 | 2.800 | Plastic | 1.661 | 20.37 | 6.643 |
| 6 | | Aspherical | −4.17 | 2.462 | | | | |
| 7 | Stop | Spherical | Infinite | 0.500 | | | | |
| 8 | Fourth lens | Aspherical | 3.110 | 1.804 | Plastic | 1.589 | 61.15 | 2.112 |
| 9 | | Aspherical | −1.638 | 0.100 | | | | |
| 10 | Fifth lens | Aspherical | −1.873 | 1.365 | Plastic | 1.661 | 20.37 | −7.372 |
| 11 | | Aspherical | −3.905 | 0.400 | | | | |
| 12 | Infrared | Spherical | Infinite | 0.400 | Glass | 1.523 | 55.00 | |
| 13 | filter | Spherical | Infinite | 1.075 | | | | |
| 14 | Protective | Spherical | Infinite | 0.400 | Glass | 1.523 | 55.00 | |
| 15 | glass | Spherical | Infinite | 0.125 | | | | |
| 16 | Image plane | Spherical | Infinite | 0.000 | | | | |

TABLE 10

Fifth embodiment

| Surface number | 1 | 2 | 3 | 4 | 5 |
|---|---|---|---|---|---|
| K | 0.00E+00 | 0.00E+00 | 1.08E+01 | −6.87E−01 | 9.99E+01 |
| A4 | 0.00E+00 | 0.00E+00 | −1.20E−03 | −2.39E−02 | −1.33E−02 |
| A6 | 0.00E+00 | 0.00E+00 | −5.74E−04 | 3.47E−04 | 2.15E−03 |
| A8 | 0.00E+00 | 0.00E+00 | 3.82E−05 | −5.19E−04 | −3.67E−04 |
| A10 | 0.00E+00 | 0.00E+00 | −1.11E−06 | 4.64E−05 | 3.15E−05 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

| Surface number | 6 | 8 | 9 | 10 | 11 |
|---|---|---|---|---|---|
| K | −1.43E−02 | 0.00E+00 | 0.00E+00 | 1.67E−01 | 0.00E+00 |
| A4 | −1.06E−03 | −6.27E−03 | 8.93E−03 | −1.25E−02 | 1.19E−02 |
| A6 | 8.34E−04 | −7.86E−03 | 2.29E−02 | 2.74E−02 | 3.81E−03 |
| A8 | −1.10E−04 | 0.00E+00 | 0.00E+00 | 1.39E−02 | 2.37E−03 |
| A10 | 7.82E−06 | 0.00E+00 | 0.00E+00 | −4.95E−03 | 4.62E−04 |
| A12 | 0.00E+00 | 0.00E+00 | 0.00E+00 | 0.00E+00 | 0.00E+00 |
| A14 | 0.00E+00 | 0.00E+00 | 0.00E+00 | 0.00E+00 | 0.00E+00 |
| A16 | 0.00E+00 | 0.00E+00 | 0.00E+00 | 0.00E+00 | 0.00E+00 |
| A18 | 0.00E+00 | 0.00E+00 | 0.00E+00 | 0.00E+00 | 0.00E+00 |
| A20 | 0.00E+00 | 0.00E+00 | 0.00E+00 | 0.00E+00 | 0.00E+00 |

According to the parameter information provided above, the following data may be deduced.

| Fifth embodiment | | | |
|---|---|---|---|
| f (mm) | 0.960 | (ΣCT68/TTL)*100 | 17.5 |
| FNO | 2.1 | ImgH/f | 1.87 |
| (½) FOV (deg.) | 92.5 | Dist (%) | −107.99 |
| RDY S3/RDY S2 | 4.05 | f/D | 2.1 |
| (SD S2)/(RDY S2) | 0.921 | f45/f | 3.395 |
| RDY S4/f2 | −0.47 | | |

Figure 11:
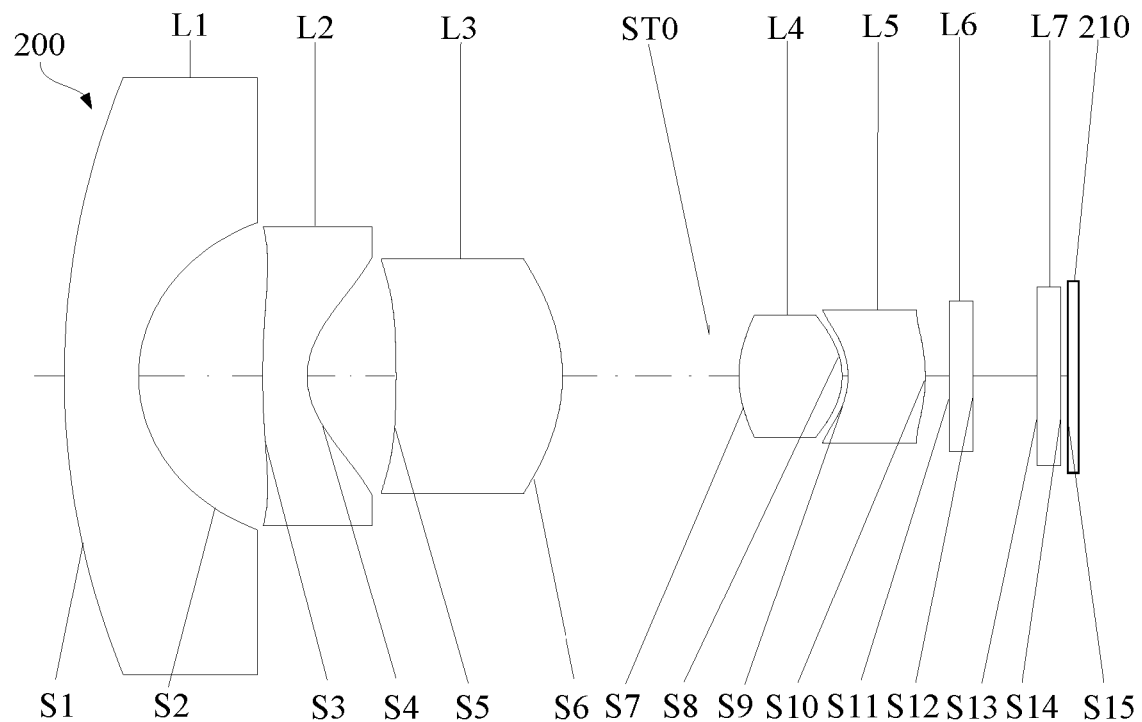
FIG. 11 is a schematic view of a camera module to which an optical system is applied according to an embodiment of the present application.

Referring to FIG. 11, an optical system and a photosensitive element 210 are assembled to form a camera module 200, and the photosensitive element 210 is arranged on the image side of the optical system. The photosensitive element 210 may be a Charge Coupled Device (CCD) or a Complementary Metal Oxide Semiconductor (CMOS).

In some embodiments, lenses in the optical system are relatively fixed to the photosensitive element 210. In this case, the camera module 200 is a fixed-focus module. In other embodiments, a voice coil motor is configured to enable the photosensitive element 210 to move relative to the lens in the optical system, so as to implement a focusing function.

The camera module 200 may be applied to electronic devices in fields such as mobile phones, vehicles, and monitoring, which may specifically serve as a mobile phone camera, a vehicle-mounted camera, or a monitoring camera.

Figure 12:
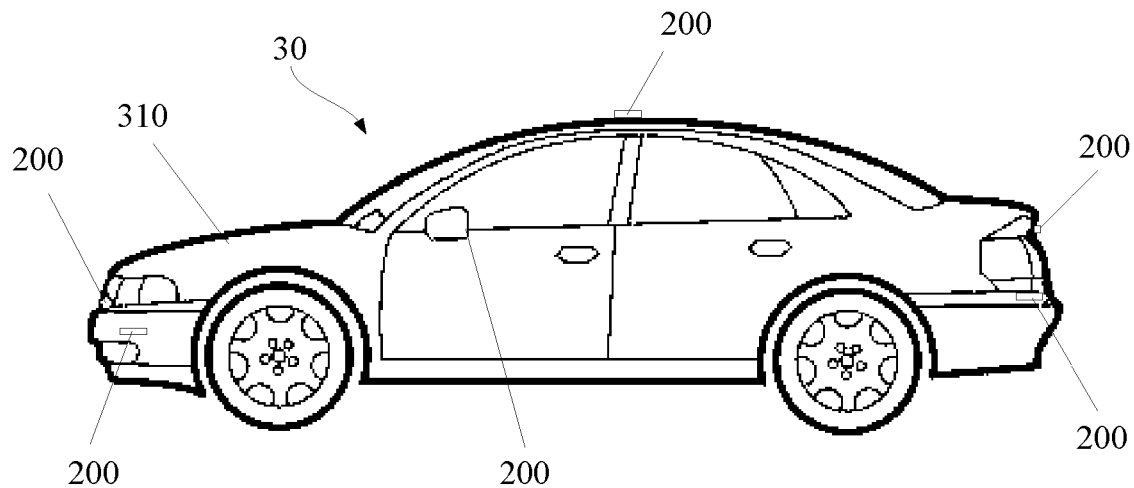
FIG. 12 is a schematic view of a vehicle to which a camera module is applied according to an embodiment of the present application.

Referring to FIG. 12, when the camera module 200 is applied to a vehicle 30 as a vehicle-mounted camera, the camera module 200 may serve as a front-view camera, a rear-view camera, or a side-view camera of the vehicle 30. Specifically, the vehicle 30 includes a vehicle body 310. The camera module 200 may be mounted at any position such as a front side (such as an air-inlet grille), a left front headlight, a right front headlight, a left rearview mirror, a right rearview mirror, a trunk, or the roof, of the vehicle body 310. Secondly, a display device may also be arranged in the vehicle 30, and the camera module 200 is in communication connection to the display device. Thus, images obtained by the camera module 200 on the vehicle body 310 can be displayed in real time on the display device, so that a driver can obtain image information around the vehicle body 310, the driver can observe peripheral visual blind regions, and driving and parking are more convenient and more secure for the driver. When a plurality of camera modules 200 are provided to acquire scenes in different orientations, image information obtained by the camera modules 200 can be synthesized and presented on the display device in a form of top views.

Specifically, the vehicle 30 includes at least four camera modules 200. The camera modules 200 are mounted on a front side (such as an air-inlet grille), a left side, a right side, and a rear side (such as a trunk) of the vehicle body 310 respectively to construct a vehicle surround view system. The vehicle surround view system includes four (or more) camera modules 200 mounted on the front, rear, left, and right sides of the vehicle body 310. The plurality of camera modules 200 may simultaneously collect scenes around the vehicle 30. Then, image information collected by the camera modules 200 is processed by an image processing unit for distortion reduction, perspective transformation, image Mosaic, image enhancement and other steps, to finally form a seamless 360° panoramic top view around the vehicle 30, which is displayed on the display device. Certainly, in addition to a panoramic view, a one-sided view of any orientation may also be displayed. In addition, a ruler line corresponding to a displayed image may also be configured on the display device to facilitate the driver to accurately determine an orientation and a distance of an obstacle.

In some embodiments, the vehicle 30 is provided with a driving recorder, and the image information obtained by the camera module 200 can be stored in the driving recorder. By use of the aforementioned camera module 200, ghosts in the image information collected by the camera module 200 can be effectively reduced, thereby improving the imaging quality.

The "electronic device" used in the embodiments of the present disclosure may include, but is not limited to, a device configured to receive/transmit communication signals via a wireline connection (such as via a public switched telephone network (PSTN), digital subscriber line (DSL), digital cable, or direct cable connection, and/or another data connection/network) and/or via a wireless interface (for example, for a cellular network, a wireless local area network (WLAN), a digital TV network such as a digital video broadcasting handheld (DVB-H) network, a satellite network, an amplitude modulation-frequency modulation (AM-FM) broadcasting transmitter, and/or another communication terminal). The electronic device configured to communicate via a wireless interface may be referred to as a "wireless communication terminal", a "wireless terminal", and/or a "mobile terminal". Examples of the mobile terminal include, but are not limited to, satellite or cellular phones; a personal communication system (PCS) terminal that may combine a cellular radiotelephone with data processing, facsimile, and data communication capabilities; a personal digital assistant (PDA) that can include a radiotelephone, pager, Internet/intranet access, Web browser, organizer, calendar, and/or a global positioning system (GPS) receiver; and a conventional laptop and/or palmtop receiver or other electronic devices including a radiotelephone transceiver.

In the description of the present disclosure, it is to be understood that the orientation or position relationship indicated by the terms "central", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are only intended to facilitate the description of the present disclosure and simplify the description, rather than indicating or implying that the device or element referred to must have a particular orientation or be constructed and operated in a particular orientation, and therefore are not to be interpreted as limitations on the present disclosure.

In addition, the terms "first" and "second" are used for descriptive purposes only, which cannot be construed as indicating or implying a relative importance, or implicitly specifying the number of the indicated technical features. Thus, the features defined with "first" and "second" may explicitly or implicitly include one or more features. In the description of the present disclosure, "a plurality of" means at least two, e.g., two, three, etc., unless otherwise specifically stated.

In the present disclosure, unless otherwise specifically stated and limited, the terms "mounting," "coupling", "connecting" and "fixing" should be understood in a broad sense, such as, a fixed connection, a detachable connection, or an integral connection; a mechanical connection or an electrical connection; a direct connection, an indirect connection through an intermediate medium, an internal connection of two elements, or an interaction of two elements. For those of ordinary skill in the art, the specific meanings of the above terms in the present disclosure can be understood on case-by-case.

In the present disclosure, unless otherwise explicitly specified and defined, the expression a first feature being "on" or "under" a second feature may be the case that the first feature is in direct contact with the second feature, or the first feature is in indirect contact with the second feature via an intermediate medium. Furthermore, the expression the first feature being "over", "above" and "on top of" the second feature may be the case that the first feature is directly above or obliquely above the second feature, or only means that the level of the first feature is higher than that of the second feature. The expression the first feature being "below", "underneath" or "under" the second feature may be the case that the first feature is directly underneath or obliquely underneath the second feature, or only means that the level of the first feature is lower than that of the second feature.

In the description of the specification, reference terms such as "one embodiment", "some embodiments", "example", "specific example" or "some examples" mean that a particular feature, structure, material, or characteristic described in connection with the embodiment or example is included in at least one embodiment or example of the present application. In the specification, the schematic expressions to the above terms are not necessarily referring to the same embodiment or example. Moreover, the described specific features, structures, materials or characteristics may be combined in any one or more embodiments or examples in any appropriate manner. In addition, without contradiction, those skilled in the art may combine different embodiments or examples described in this specification and features of the different embodiments or examples.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the invention. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. An optical system, consisting of, sequentially from an object side to an image side:
   a first lens having a negative refractive power, an object side surface of the first lens being convex, and an image side surface of the first lens being concave;
   a second lens having a negative refractive power, an image side surface of the second lens being concave;
   a third lens having a positive refractive power;
   a stop;
   a fourth lens having a positive refractive power; and
   a fifth lens having a negative refractive power;
   the optical system satisfying the following relations:

$(SD\ S2)/(RDY\ S2)<0.93;$ wherein SD S2 denotes a Y-direction semi-aperture of the image side surface of the first lens, and RDY S2 denotes a Y-radius of the image side surface of the first lens; and $Nd2 \leq 1.55; Nd4 \leq 1.55; Vd2 \geq 54;$ and $Vd4 \geq 54;$ wherein Nd2 denotes a refractive index of d-line of the second lens, Nd4 denotes a refractive index of d-line of the fourth lens, Vd2 denotes an abbe number of the second lens, and Vd4 denotes an abbe number of the fourth lens.

2. The optical system according to claim 1, wherein the optical system satisfies a following relation:

$RDY\ S3/RDY\ S2<7.5;$ wherein RDY S3 denotes a Y-radius of an object side surface of the second lens.

3. The optical system according to claim 2, wherein, when RDY S3 is negative, the optical system satisfies a following relation: $-15.0<RDY\ S3/RDY\ S2<-7.5.$ 4. The optical system according to claim 2, wherein, when RDY S3 is positive, the optical system satisfies a following relation: $3.5<RDY\ S3/RDY\ S2<5.5.$ 5. The optical system according to claim 1, wherein the optical system satisfies a following relation:

$RDY\ S4/f2<-0.45;$ wherein RDY S4 denotes a Y-radius of the image side surface of the second lens, and f2 denotes a focal length of the second lens.

6. The optical system according to claim 1, wherein the optical system satisfies a following relation:

$(\Sigma CT68/TTL)*100<12.9;$ wherein $\Sigma CT68$ denotes a distance between an image side surface of the third lens and an object side surface of the fourth lens at an optical axis, and TTL denotes a total length of the optical system.

7. The optical system according to claim 1, wherein the optical system satisfies a following relation:

$ImgH/f>1.5;$ wherein ImgH denotes half of an image height of the optical system in a horizontal direction, and f denotes a focal length of the optical system.

8. The optical system according to claim 1, wherein the optical system satisfies a following relation:

$|Dist|<110;$ wherein Dist denotes an optical distortion of the optical system, and Dist is in units of %.

9. The optical system according to claim 1, wherein the optical system satisfies a following relation:

$f/D \leq 2.1;$ wherein f denotes a focal length of the optical system, and D denotes an entrance pupil diameter of the optical system.

10. The optical system according to claim 1, wherein the optical system satisfies following relations:

$Nd3 \geq 1.55; Nd5 \geq 1.55; Vd3 \leq 33;$ and $Vd5 \leq 33;$ wherein Nd3 denotes a refractive index of d-line of the third lens, Nd5 denotes a refractive index of d-line of the fifth lens, Vd3 denotes an abbe number of the third lens, and Vd5 denotes an abbe number of the fifth lens.

11. The optical system according to claim 1, wherein the optical system satisfies a following relation:

$FOV \geq 180°$;

wherein FOV denotes a field of view of the optical system in a horizontal direction.

12. The optical system according to claim 1, wherein an object side surface of the fifth lens is concave, and an image side surface of the fifth lens is convex.

13. A camera module, comprising a photosensitive element and the optical system according to claim 1, the photosensitive element being arranged on the image side of the optical system.

14. A vehicle, comprising a vehicle body, a display device, and a plurality of camera modules according to claim 13, the plurality of camera modules being in communication connection with the display device; a front side, a rear side, a left side, and a right side of the vehicle body being respectively provided with at least one of the camera modules, the plurality of camera modules being capable of acquiring images around the vehicle body, and the images being capable of being displayed on the display device.

15. An optical system, consisting of, sequentially from an object side to an image side:
  a first lens having a negative refractive power, an object side surface of the first lens being convex, and an image side surface of the first lens being concave;
  a second lens having a negative refractive power, an image side surface of the second lens being concave;
  a third lens having a positive refractive power;
  a stop;
  a fourth lens having a positive refractive power; and
  a fifth lens having a negative refractive power;
  the optical system satisfying the following relations:

$(SD\ S2)/(RDY\ S2) < 0.93$;

wherein SD S2 denotes a Y-direction semi-aperture of the image side surface of the first lens, and RDY S2 denotes a Y-radius of the image side surface of the first lens; and $3 < f45/f < 4$;

wherein f45 denotes a combined focal length of the fourth lens and the fifth lens, and f denotes a focal length of the optical system.

16. An optical system, consisting of, sequentially from an object side to an image side:
  a first lens having a negative refractive power, an object side surface of the first lens being convex, and an image side surface of the first lens being concave;
  a second lens having a negative refractive power, an image side surface of the second lens being concave;
  a third lens having a positive refractive power;
  a stop;
  a fourth lens having a positive refractive power; and
  a fifth lens having a negative refractive power;
  the optical system satisfying the following relations:

$(SD\ S2)/(RDY\ S2) < 0.93$;

wherein SD S2 denotes a Y-direction semi-aperture of the image side surface of the first lens, and RDY S2 denotes a Y-radius of the image side surface of the first lens;

$f/D \geq 2.1$;

wherein f denotes a focal length of the optical system, and D denotes an entrance pupil diameter of the optical system;

$FOV \geq 180°$;

wherein FOV denotes a field of view of the optical system in a horizontal direction; and $(\Sigma CT68/TTL)*100 < 12.9$;

wherein $\Sigma CT68$ denotes a distance between an image side surface of the third lens and an object side surface of the fourth lens at an optical axis, and TTL denotes a total length of the optical system.

* * * * *